United States Patent [19]

Kato et al.

[11] Patent Number: 4,487,898

[45] Date of Patent: Dec. 11, 1984

[54] PROCESS OF CONTINUOUS SUSPENSION POLYMERIZATION

[75] Inventors: Shinji Kato; Kyouji Uku; Hisashi Morikawa, all of Takasago, Japan

[73] Assignee: Kanegafuchi Chemical Industry Co., Ltd., Osaka, Japan

[21] Appl. No.: 384,936

[22] Filed: Jun. 4, 1982

[30] Foreign Application Priority Data

Jun. 12, 1981 [JP] Japan ................................ 56-91314
Nov. 27, 1981 [JP] Japan ................................ 56-191380

[51] Int. Cl.³ ............................................. C08F 2/18
[52] U.S. Cl. ........................................ 526/65; 526/88
[58] Field of Search ..................................... 526/65, 88

[56] References Cited

U.S. PATENT DOCUMENTS

| | | | |
|---|---|---|---|
| 2,813,850 | 11/1957 | Van Dijk | 526/88 |
| 3,922,255 | 11/1975 | Koestler et al. | 526/65 |
| 4,017,670 | 4/1977 | Spicuzza | 526/88 |

*Primary Examiner*—Paul R. Michl
*Attorney, Agent, or Firm*—Wegner & Bretschneider

[57] ABSTRACT

A continuous suspension polymerization process for the production of polymeric particles substantially uniform particle size, entailing the steps of forming monomer droplets of substantially uniform particle size through an orifice under vibration, and effecting polymerization of the monomer droplets in an aqueous medium. The process permits carrying out polymerization without destruction or agglomeration of the monomer droplets, so that the particle size of the polymeric particles thus produced depends predominantly upon the particle size of the monomer droplets as initially formed.

4 Claims, 2 Drawing Figures

PROCESS OF CONTINUOUS SUSPENSION POLYMERIZATION

BACKGROUND OF THE INVENTION

1. Field of the Invention

The present invention relates to a process of continuous suspension polymerization. More specifically, it relates to a process of continuous suspension polymerization for producing polymer particles having uniform size and a narrow distribution of particle sizes.

2. Description of the Prior Art

Unsaturated compounds containing vinyl groups are normally suspension-polymerized batchwise by charging monomers into an aqueous suspension medium containing a suspending agent and heating the mixture while suspending it by a mechanical means such as an agitator. In this process, the sizes of the obtained polymer particles are liable to be dependent on an agitation effect and the distribution of the size of the obtained polymer particles becomes broad, because it is next to impossible to provide the uniform agitation effect at any particular spot within a polymerization reactor.

In order to eliminate the foregoing deficiencies in the conventional process, studies have been made on a process for production of the polymer particles with the uniform size, not by suspending into the aqueous suspension medium monomers by a mechanical means such as an agitator, but by suspending by means of a nozzle and the like monomer droplets of uniform size into the aqueous suspension medium, then effecting the polymerization at an elevated temperature without causing destruction of the monomer droplets.

SUMMARY OF THE INVENTION

It is therefore an object of the present invention to provide a new process of continuous suspension polymerization without using a mechanical agitation means.

It is another object of the present invention to provide a new process of continuous suspension polymerization which is capable of producing polymer particles with uniform sizes and falling within a narrow range of particle size distribution.

These and other objects of the present invention together with the advantages thereof will become apparent to those skilled in the art from the detailed disclosure of the present invention as set forth hereinbelow.

Attention has been focused by the present inventors upon the fact that the specific gravity of polymerizable monomer droplets increases as they polymerize, and that the difference in the specific gravities between said monomer droplets and the aqueous dispersion medium changes with the passage of time. That is, the present invention comprises the steps of;

a first reaction step in which necessary procedures are carried out until the specific gravity of the polymerizable monomer droplets, smaller than that of the aqueous suspension medium, arrives at the vicinity of the specific gravity of said medium, a second reaction step in which procedures are taken until the specific gravity of the polymerizable monomer droplets somewhat exceeds that of the aqueous suspension medium, a third reaction step in which the polymerizable monomer droplets continue to polymerize to a desired degree of conversion, procedures, whereby polymer particles of uniform particle size are continuously produced by the utilization of the difference in the specific gravities as well as the flow of the aqueous suspension medium.

DETAILED DESCRIPTION OF THE INVENTION

Figure 1:
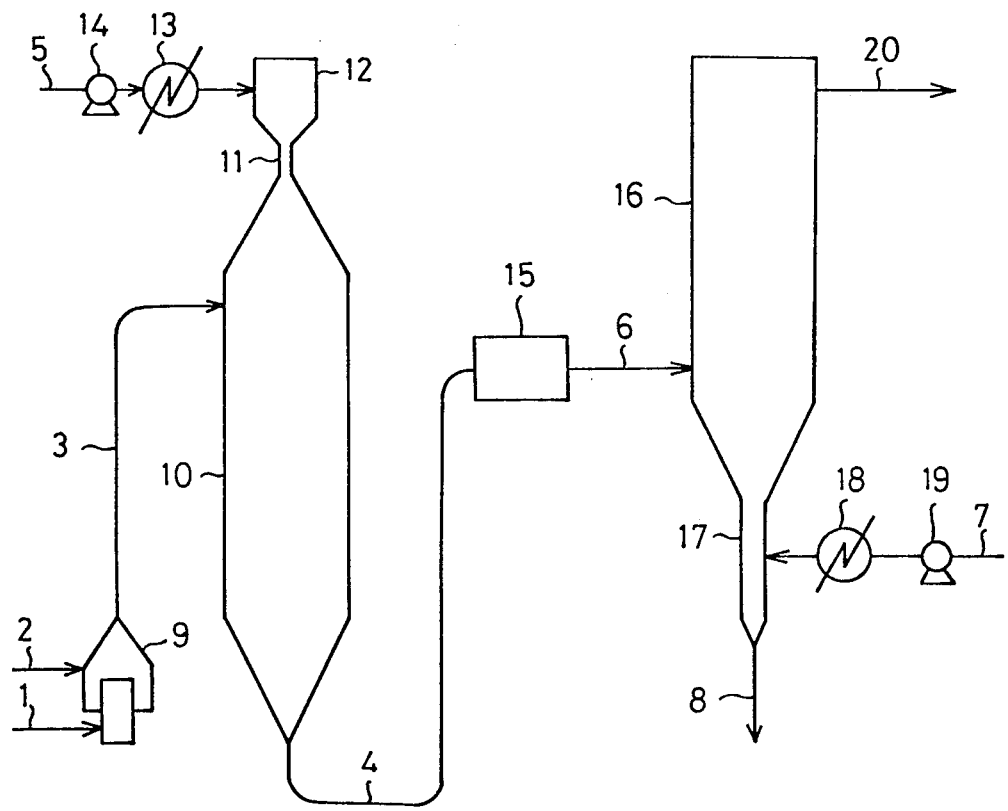
FIG. 1 is a diagrammatic illustration showing an embodiment of the present invention.

Stated more specifically, the polymerizable monomer is introduced into the monomer droplets generators which allows the monomer to jet out through at least one orifice into the aqueous suspension medium while imparting vibration to the monomer, to produce monomer droplets of uniform size, and the aqueous suspension medium is also introduced into said generator through another inlet located thereon, said medium being suitable for dispersing and holding the polymerizable monomer droplets without agglomeration of the droplets, the mixed flow comprising the aqueous suspension medium and the polymerizable monomer droplets exiting from said generator being then led through a conduit into a first reaction step where the conditions including temperature are ready for the commencement of the polymerization and the aqueous suspension medium flows downward.

In the first reaction step the polymerizable monomer droplets are maintained in a fluidized bed by the action of the buoyancy of the polymerizable monomer droplets per se and the resistance of the downward flow of the aqueous suspension medium, and the polymerization is continued in this state until the specific gravity of the polymerizable monomer droplets nears that of the aqueous suspension medium. The polymerizable monomer droplets upon reaching the desired specific gravity lose buoyancy and thus move from said first reaction step to a second reaction step together with the flow of the aqueous suspension medium.

In said second step the polymerization is effected for a given residence time so that the specific gravity of the polymerizable monomer droplets becomes somewhat greater than that of the aqueous suspension medium. Thereafter, the resulting mixture is moved to a third reaction step.

In said third reaction step the polymerizable monomer droplets are held in a fluidized bed due to the sedimentation force of said polymerizable monomer droplets and the resistance of the upward flow of the aqueous suspension medium ascending through the sorting column positioned at the bottom of a reactor in said third reaction step. Thereafter, polymer particles reaching the specific gravity corresponding to a desired degree of conversion are selectively recovered.

As the downward flow of the aqueous suspension medium in said first reaction step it is also possible to use, the aqueous suspension medium recovered from the upper portion of said second and/or third reaction steps. As the upward flow of the aqueous suspension medium in said third reaction step, it is also possible only to recover and reuse the aqueous suspension medium from the upper portion of said third reaction step in itself. By the recirculated use of the aqueous suspension medium as aforesaid, the amount of the aqueous suspension medium that need by newly fed to the apparatus can be markedly reduced.

In said second reaction step, when a large capacity reactor is disadvantageously required to obtain the residence time sufficient to provide monomer droplets with a necessary conversion, it is possible to reduce the volume of the reactor used in this step by employing a reactor which is capable of separation the polymerizable monomer droplets of the greater specific gravity from those of the smaller specific gravity as compared with the specific gravity of the aqueous suspension medium, then transporting said monomer droplets of the greater specific gravity to said third reaction step, while recirculating back said monomer droplets of the smaller specific gravity to said first reaction step together with the aqueous suspension medium, to thus continue the polymerization. The reactor equipped with such a separating function may be designed with ease.

As the polymerizable monomers, vinyl-series unsaturated compounds such as styrene, divinylbenzene, acrylic acid, methacrylic acid, esters of acrylic and methacrylic acids, containing, at least, a polymerization initiator may be included. It is also effective to add, prior to the polymerization, monomer-soluble or monomer-dispersing substances, according to the qualities of the polymer product required. Moreover, monomers containing polymers of foregoing vinyl-series unsaturated compounds may also be employed, but naturally the content of the polymers is limited to the range of viscosity within which the formation of droplets is possible, and hence not more than 20% by weight is preferred.

As the aqueous suspension medium used in the present invention, water dissolving or dispersing suspension stabilizers commonly used in suspension polymerization may be used. Examples of suspension stabilizers are organic polymer suspending agents such as PVA, PVP and CMC, or inorganic suspending agents such as calcium phosphate and calcium carbonate. These are used singly or in combinations of two or more. Furthermore, surface active agents may, if required, be also added. When the organic suspending agents are employed, dissolution of a monomer in an aqueous phase is promoted, thus causing emulsion polymerization, through which suspending and protecting polymerizable monomer droplets by the aqueous suspension medium are sometimes hindered, the aqueous suspension medium is made turbid and other undesired effects appear. For these reasons, it is preferred to add to the aqueous suspension medium suitable amounts of water soluble polymerization inhibitors such as nitrites.

The principle of the monomer droplets generator used in the present invention is to impose regular vibration on a monomer jet formed by an orifice or orifices, to thus cut the monomer jet with frequency of vibration, thereby generating monomer droplets with uniform size. The principle is well-known to the art from Rayleigh's study (Proc. London Math. Soc., 10, 4, 1878).

The particle size and distribution of the polymer product produced by the present invention is predominantly determined by the size of monomer droplets generated by the monomer droplets generator, because of the feature of the present invention which prevents destruction or agglomeration of the monomer droplets generated until the termination of polmerization. The conditions for obtaining the desired particle size are predominantly influenced by the pore size of the orifice, flow rate of the polymerizable monomer through the orifice, viscosity of the polymerizable monomer, frequency of regular vibration imparted to the jetting flow and initial disturbance imposed on the monomer jet.

Hereinafter, the description will be made referring to FIG. 1.

A polymerizable monomer comprising a vinyl unsaturated compound containing a polymerization initiator is introduced through a conduit 1 into a monomer droplets generator 9, while through another inlet of said generator 9 an aqueous suspension medium is introduced through a conduit 2. The polymerizable monomer is converted in the monomer droplets generator 9 into droplets of uniform size and then the aqueous suspension medium and the polymerizable monomer droplets are charged through a conduit 3 into a first reactor 10.

On the other hand, into said first reactor 10 the aqueous suspension medium is introduced through a conduit 5 via a pump 14, a heat exchanger 13, a head tank 12 provided at the upper portion of said first reactor and at least one separator tube 11, then transported from the bottom of the reactor to a second reactor 15 through a conduit 4, whereby downward flow of the aqueous suspension medium with a controlled temperature and flow rate is provided in said first reactor 10.

The velocity of the downward flow of the aqueous suspension medium in the reactor 10 is controlled to be smaller than the ascending velocity of the polymerizable monomer droplets owing to the buoyancy so that a fluidized bed is formed by the action of the buoyancy of the polymerizable monomer droplets and the downward flow of the aqueous suspension medium. In the fluidized bed so formed, the polymerization reaction takes place.

The velocity of the downward flow of the aqueous suspension medium for circulation in the separator tube 11 is controlled to be greater than the ascending velocity by the buoyancy of the monomer droplets. By so doing, the monomer droplets introduced into the reactor 10 are prevented from going up to enter the head tank 12 via the separator tube 11.

On the other hand, air bubbles generated by deaeration, because of elevated temperature, of dissolved air in the aqueous suspension medium are discharged from the head tank 12 via the separator tube 11 by controlling the velocity of the downward flow in the separator tube 11 to be smaller than the ascending velocity of air bubbles.

As a result of the foregoing, it is necessary that the velocity of the downward flow in the separator tube 11 be kept within the range smaller than the ascending velocity of air bubbles and greater than the ascending velocity of monomer droplets. Due to the great difference in specific gravities, the conditions satisfying the foregoing specific requirements may be determined with ease and under these conditions a stable steady state is maintained.

The monomer droplets, which polymerize in the reactor 10 and their specific gravity increased to the vicinity of that of the aqueous suspension medium, lose the buoyancy against the downward flowing of the aqueous suspension medium and thus sink to the lower portion of the reactor 10, then are transported together with recirculating flow of the aqueous suspension medium to a reactor 15 of a second reaction step via a conduit 4.

Care must be taken that in the reactor 10 a desirable fluidized bed of the aqueous suspension medium is formed, in which the polymerization is performed without causing agglomeration or destruction of monomer droplets, and that only the droplets which have arrived at the desired degree of conversion should be transported to the reactor 15 used in said second reaction step. For this purpose, it is desired that the velocity of the downward flow of the aqueous suspension medium be within the range of from about 0.2 cm/sec to about 1 cm/sec in the superficial velocity, and especially when the conversion, prior to the transportation to the reactor 15, has to be enhanced, 0.2 cm/sec or less superficial velocity is preferred, wherein superficial velocity means the average linear velocity of the fluid that would have in the column if no droplets were present. As a reactor suitable for the purpose, a multi-stage cylindrical reactor designed so that the inside diameter of a lower portion is greater than that of an upper portion, or a tapered cylindrical reactor having an expanded diameter toward the lower portion may be effectively employed.

In the reactor 15 used in said second reaction step, there is substantially no difference in specific gravity between the aqueous suspension medium and the monomer droplets so that the monomer droplets move together with the flow of the aqueous suspension medium. The reactor 15 is a tubular reactor which possesses the residence time sufficient to polymerize the monomer droplets until the specific gravity of the monomer droplets at an outlet of the reactor becomes greater than that of the aqueous suspension medium.

The monomer droplets existing from said second reaction step are led to a reactor 16 used in a third reaction step.

In the reactor 16 the aqueous suspension medium having a controlled temperature and a flow rate is introduced via a pump 19 and a heat exchanger 18 into a sorting column 17 where an upward flow is created.

Said third reaction step is such that the monomer droplets introduced into the reactor 16 are maintained in the reactor 16 until they polymerize to thereby have a specific gravity surpassing the upward flowing in the sorting column 17, thus precipitating at the bottom. Accordingly, only the polymer particles polymerized to have the desired specific gravity are selectively precipitated at the lower portion of the sorting column 17 and then recovered. The conversion of the obtained polymer particles is controlled by the selection of the ascending velocity of the aqueous suspension medium in the sorting column 17.

Figure 2:
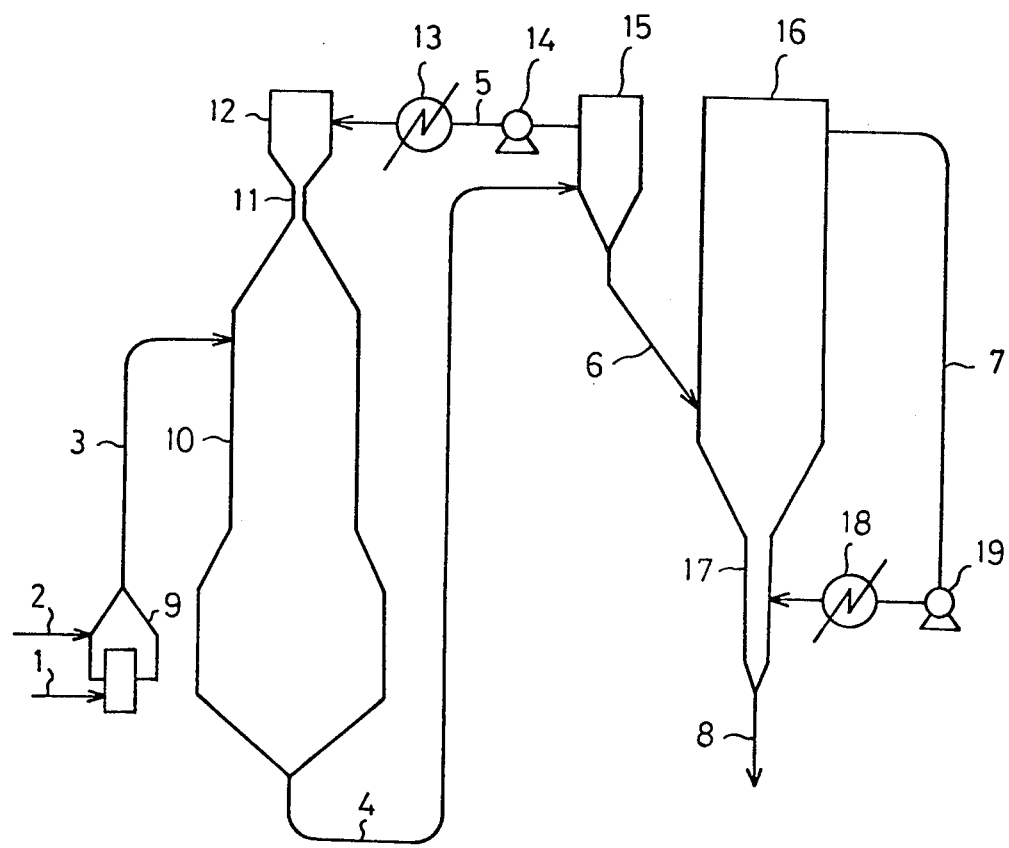
FIG. 2 depicts a diagrammatic illustration of another embodiment of the present invention.

FIG. 2 shows another embodiment of practicing the present invention.

In FIG. 2, the reactor 15 used in said second reaction step is equipped with a function of separating monomer droplets with greater specific gravity from those with smaller specific gravity, as compared with the specific gravity of a aqueous suspension medium, and only monomer droplets having the specific gravity greater than that of the aqueous suspension medium are transferred from the bottom of the reactor 15 to the reactor 16 used in said third reaction step via the conduit 6, while those having the smaller specific gravity are entrained in the aqueous suspension medium and recirculated back to the head tank 12 via the pump 14 and the heat exchanger 13. Moreover in said third reaction step the aqueous suspension medium is recirculated from the upper portion of the reactor 16 to the sorting column 17, via the conduit 7, the pump 19 and the heat exchanger 18, and then reused.

Hereinbelow the invention will be described in more detail by way of examples that follow, to which examples the invention should not be construed to be limited.

EXAMPLE 1

The polymerization experiment was carried out by using an apparatus shown in FIG. 1.

A polymerizable monomer comprising styrene containing benzoyl peroxide in an amount of 0.32 PHR was introduced at a rate of 10 cc/min into a monomer droplets generator 9 via a conduit 1. On the other hand, into said generator 9 an aqueous suspension medium was led at a rate of 20 cc/min via a conduit 2, whereby said generator 9 and a conduit 3 were filled therewith. The aqueous suspension medium comprised pure water having dissolved in it 1000 ppm of PVA and 50 ppm of sodium nitrite. The monomer drops generator 9 permitted the monomer to jet out as a jetting flow into the aqueous suspension medium from a 0.4 mm diameter orifice of a stainless steel orifice plate, imposing a frequency of 250 Hz on the jetting flow to form monomer droplets having uniform size.

The flow of the aqueous suspension medium and the monomer droplets thus obtained was charged via the conduit 3 into the reactor 10 used in said first reaction step.

Meanwhile, prior to introducing the monomer droplets, the entirety of the apparatus was filled with the foregoing aqueous suspension medium. In the reactor 10 the downward flow of the aqueous suspension medium having a controlled temperature of 90° C. was provided at a superficial velocity of 0.22 cm/sec.

The reactor 10 was a cylindrical reactor having the inside diameter of 70 mm and the height of 1500 mm. A separator tube 11 had the inside diameter of 7 mm and the height of 50 mm. The superficial velocity of the downward flow of the aqueous suspension medium in the separator tube 11 was 5.6 cm/sec. In order to form downward flow as aforesaid in the reactor 10, the aqueous suspension medium was supplied at a rate of 500 cc/min into the head tank 12 mounted at the top of the reactor 10 via the conduit 5, the pump 14 and the heat exchanger 13. The monomer droplets introduced into the reactor 10 formed a fluidized bed from the upper portion of the reactor and did not enter the head tank 12, while only air bubbles generated in the reactor went up to enter the head tank 12, and then were discharged.

When 170 minutes passed since the commencement of introducing monomer droplets, polymerized droplets began to move from the bottom of the reactor 10 to the reactor 15 used in said second reaction step via the conduit 4.

As the reactor 15, a tubular reactor, 32 mm in inside diameter and 12 m in length was served. In the reactor 15 the aqueous suspension medium and monomer droplets flowed in a state of plug flow and moved, after the residence time of about 20 minutes, to the reactor 16 used in said third reaction step via the conduit 6. The conversion of the droplets was within the range between about 65% and about 70%.

The reactor 16 used in said third reaction step comprised a cylindrical vessel, 140 mm in inside diameter and 450 mm in height, to the lower portion of which the sorting column 17 was connected, having an inside diameter of 27 mm and the height of 300 mm. Into the sorting column 17 the aqueous suspension medium was supplied at a rate of 1000 cc/min via the conduit 7, the pump 19 and the heat exchanger 18 to provide upward flow in the sorting column 17. The upward flow was discharged via the conduit 20 after being separated from the droplets at the upper portion of the reactor 16. 5 hours after the beginning of charging monomer droplets, polymer particles began to precipitate at the bottom of the sorting column 17 and thereafter the system arrived at steady state.

The conversion of the polymer particles taken from the bottom of the sorting column was 93% and they showed the particle size distribution as depicted in Table 1.

TABLE 1

| Class range* (meshes) | ~7 | 7~10 | 10~12 | 12~14 | 14~16 | 16~20 | 20~24 | 24~ |
|---|---|---|---|---|---|---|---|---|
| Amount (wt %) | 0 | 0 | trace | 15.5 | 70.0 | 11.5 | 3.0 | 0 |

Class range was according to Tyler standard sieve.

EXAMPLE 2

The polymerization experiment was carried out in the same conditions as in Example 1—the polymerizable monomer composition, the aqueous suspension medium composition and monomer drops generating conditions, excepting that an apparatus shown in FIG. 2 was used.

The entirety of the apparatus including said first reactor 10 was filled with the aqueous suspension medium prior to the introduction of monomer droplets and in the reactor 10 the aqueous suspension medium was allowed to flow downward at a superficial velocity of 0.32 cm/sec with a temperature controlled to 90° C. As said first reactor 10, a multi-stage cylindrical reactor which comprised upper cylindrical reactor portion, 70 mm in inside diameter and 1200 mm in height mounted on lower cylindrical reactor portion, 140 mm in inside diameter and 300 mm in height and tapered portion, 80 mm in height to connect the upper and lower cylindrical reactor portions was employed. The separator tube 11 at the top of the upper portion had the inside diameter of 17.5 mm and the height of 50 mm and the downward flow was 5.2 cm/sec of superficial velocity.

The monomer drops introduced into said first reactor formed a fluidized bed from the upper portion of the reactor and the separator tube 11 permitted only air bubbles evolved in said first reactor 10 to enter the head tank 12, while preventing the rising of monomer droplets therethrough.

At the time 150 minutes passed after charging of the monomer droplets, transportation of the polymerized droplets was begun from the bottom of said first reactor to said second reactor 15 via the conduit 4.

Said second reactor 15 comprised an upper cylindrical vessel and a lower conical vessel, having an inside diameter of 70 mm and a height of 150 mm.

As soon as the droplets began to move from said first reactor to said second reactor, the droplets were entrained by the flow of the aqueous suspension medium in the conduit 5 and then recirculated back to said first reactor via the pump 14, the heat exchanger 13, the head tank 12 and the separator tube 11. A roller pump served as the pump 14, but neither destruction nor agglomeration of the droplets could be observed.

When 195 minutes had passed since the commencement of charging monomer droplets, the droplets began to move from the bottom of said second reactor 15 to said third reactor 16 via the conduit 6. The droplets exhibited the conversion ranging from about 65% to about 70%.

Said third reactor was fabricated of an upper cylindrical vessel and a lower conical vessel, 140 mm in inside diameter and 450 mm in height. To the bottom of the reactor was connected the sorting column 17, 27 mm in inside diameter and 300 mm in height. From the upper portion of said third reactor 16 the aqueous suspension medium was led into the middle portion of the sorting column 17 via the pump 19 and the heat exchanger 18 to thereby provide upward flow of the aqueous suspension medium at a superficial velocity of 2.8 cm/sec with a temperature controlled to 90° C.

After 270 minutes from charging of the monomer droplets, the preciptating of the polymer particles at the bottom of the sorting column 17 began and then the system reached steady state.

The polymer particles removed from the bottom of the sorting column showed the conversion of 90% and the particle size distribution as given in Table 2.

TABLE 2

| Class range* (meshes) | ~7 | 7~10 | 10~12 | 12~14 | 14~16 | 16~20 | 20~24 | 24~ |
|---|---|---|---|---|---|---|---|---|
| Amount (wt %) | 0 | 0 | trace | 17.0 | 69.5 | 11.0 | 2.5 | 0 |

EXAMPLE 3

Experiment was effected in a similar fashion to that of Example 1, with the exception that upward flow was set at a superficial velocity of 1.7 cm/sec in the sorting column positioned at the bottom of said third reactor. The conversion of the polymer particles obtained was 75%.

EXAMPLE 4

The polymerization was performed using the same apparatus under the same conditions as in Example 1, excepting that pure water containing 1350 ppm of calcium phosphate fine powder, 17 ppm of an anionic surfactant, 80 ppm of PVA and 50 ppm of sodium nitrite served as an aqueous suspension medium. Stable continuous polymerization was continued similarly to Example 1.

What we claim is:

1. A continuous suspension polymerization process for producing polymeric particles of substantially uniform particle size, which comprises the steps of
    (1) jetting a monomeric liquid through an orifice under vibration into a first vertical reactor charged with aqueous medium to make monomeric droplets dispersed in aqueous medium, the specific gravity of the monomeric droplets being smaller than that of the aqueous medium, (2) letting the resulting dispersion flow downwardly in the first reactor at a superficial velocity of not more than 1 cm/sec to make a fluidized bed and carrying out the polymerization of the monomeric droplets in the fluidized bed until the polymerizing droplets attain a specific gravity nearly equal to that of the aqueous medium, so that destruction or agglomeration of the polymerizing droplets no longer takes place, (3) sending the resultant polymerizing droplets from the bottom of the first reactor to the lower part of a second vertical reactor wherein further polymerization proceeds in the polymerizing droplets as they flow upward through the second reactor, (4) returning the resulting droplets from the upper part of the second reactor through a pump to the upper part of the first reactor, the circulation of droplets among the first and second reactors being carried out until the polymerizing droplets attain a specific gravity larger than that of the aqueous medium, and (5) letting the resulting polymerized droplets having a specific gravity larger than the aqueous medium flow from the bottom of the second reactor.

2. The process of claim 1, wherein the monomeric liquid is one in which can be dissolved therein not more than 20% by weight of the polymer produced by the polymerization of the monomeric liquid.

3. The process of claim 1, wherein the aqueous medium contains an organic polymer protective colloid and a water-soluble polymerization initiator.

4. The process of claim 1, wherein the superficial velocity is not less than about 0.2 cm/sec.

* * * * *